(12) United States Patent
Haugan et al.

(10) Patent No.: US 6,995,494 B2
(45) Date of Patent: Feb. 7, 2006

(54) AXIAL GAP BRUSHLESS DC MOTOR

(75) Inventors: Oyvin Haugan, Houston, TX (US); Bernard B. Poore, East Moline, IL (US)

(73) Assignee: Deere & Company, Moline, IL (US)

( * ) Notice: Subject to any disclaimer, the term of this patent is extended or adjusted under 35 U.S.C. 154(b) by 81 days.

(21) Appl. No.: 10/641,773

(22) Filed: Aug. 15, 2003

(65) Prior Publication Data

US 2004/0070307 A1 Apr. 15, 2004

Related U.S. Application Data

(63) Continuation-in-part of application No. 10/269,691, filed on Oct. 14, 2002, now abandoned.

(51) Int. Cl.
*H02K 21/24* (2006.01)
*H02K 1/06* (2006.01)

(52) U.S. Cl. .................. 310/268; 310/254; 310/266; 310/156.32; 310/156.35

(58) Field of Classification Search ............ 310/156.32, 310/156.33, 156.34, 156.35, 254, 268, 266
See application file for complete search history.

(56) References Cited

U.S. PATENT DOCUMENTS

| | | | | |
|---|---|---|---|---|
| 2,873,395 | A | * | 2/1959 | Kober .................. 310/112 |
| 3,072,814 | A | * | 1/1963 | Moressee et al. ........... 310/268 |
| 4,578,610 | A | * | 3/1986 | Kliman et al. ......... 310/156.35 |
| 5,218,251 | A | * | 6/1993 | Allwine, Jr. .............. 310/49 R |
| 5,397,953 | A | * | 3/1995 | Cho ........................... 310/254 |
| 5,642,009 | A | * | 6/1997 | McCleer et al. ....... 310/156.35 |
| 5,907,210 | A | * | 5/1999 | Chaix ........................ 310/268 |
| 6,011,337 | A | | 1/2000 | Lin et al. ............... 310/156.37 |
| 6,259,233 | B1 | | 7/2001 | Caamano |
| 6,605,883 | B2 | * | 8/2003 | Isozaki et al. ............ 310/49 R |

FOREIGN PATENT DOCUMENTS

| | | | |
|---|---|---|---|
| EP | 1 220 426 A3 | | 9/2003 |
| GB | 2098407 | * | 11/1982 |
| JP | 06245458 | | 9/1994 |
| JP | 07-336967 | * | 12/1995 |
| JP | 11089199 | | 3/1999 |
| JP | 2002 084720 | | 3/2002 |

OTHER PUBLICATIONS

Hendershot et al. "Design of Brushless Permanent–Magnet Motors" 1994, p. 3–1 to 3–13.*
Cap H: "Neue Wege In Der Antriebstechynik Mit Dem Axialflussmotor"—Antriebstechnik, Krausskopf Verlag Fur Wirtschaft GMBH, Mainz, DE—vol. 33, No. ½, 1994, pp. 39–40.
Cho C P et al: "Detent Torque and Axial Force Effects in a Dual Air–Gap Axial–Fieldbrushless Motor"—Nov. 29, 1993, IEEE Transactions on Magnetics, IEEE Inc. New York, US, vol. 29, NR. 6 pp. 2416–2418.
Bianchi N et al: "Design Technninques for Reducing the Cogging Torque in Surface–Mounted PM Motors"—vol. 1, Oct. 8, 2000, pp. 179–185.
Light Engineering Corporation, "Electric Motor or Generator", Jul. 10, 2001, Morgan Hill, CA, USA.

* cited by examiner

*Primary Examiner*—Burton Mullins

(57) ABSTRACT

A dual stator axial gap DC brushless machine is provided with first and second stators having equal pole counts, a given pole arc, and a given slot arc. A rotor is disposed between the first and second stators, having a pole count greater than the first and second stators. The pole count ratio between each stator and the rotor is six to eight. The second stator has a given degree of angular displacement relative to the first stator less than, ¾, ½ or ¼ the pole arc of the stators, but not less than the slot arc of the stators. Where the first and second stators each have a pole count of 18 and the rotor has a pole count of 24, the stator pole arc is 20 degrees, the rotor pole arc is 15 degrees, and the given degree of angular displacement is less than 20 degrees, 15 degrees, 10 degrees, or 5 degrees.

18 Claims, 9 Drawing Sheets

AXIAL GAP BRUSHLESS DC MOTOR

CROSS REFERENCE TO RELATED APPLICATION

This application is a continuation-in-part of application Ser. No. 10/269,691, filed Oct. 4, 2002 now abandoned.

FIELD OF THE INVENTION

This invention relates to the field of the electric machines. In particular, this invention is drawn to a dual stator axial gap and brushless DC motor.

BACKGROUND OF THE INVENTION

There are many types of electric machines (motors and/or alternators) in the prior art. Each type of electric machine has various advantages and disadvantages for any particular application. Therefore, the type of machine used typically depends on the application. One type of electric machine is a brushless permanent magnet DC machine. A typical brushless permanent magnet machine will have a relatively high power density because of its high-efficiency and because most losses occur in the stator, which is much easier to cool then a rotor. Expensive, rare earth magnets can provide a stronger magnetic field that can significantly increase the power density of such motors, but also result in a higher manufacturing cost.

In some applications of DC motors, a high torque, low speed motor is desired. For example, motors for a traction drive system require high torque, low speed motors. Each of these attributes can be enhanced by increasing the pole count of a motor. However, as mentioned above, rare earth magnets, as well as other components of the motor, make increasing the pole count expensive.

Typical brushless motors require a control system providing a sophisticated switched mode power amplifier or a three phase sinusoidal inverter (when driven by sinusoidal excitation, brushless permanent magnet machines are often called permanent magnet synchronous machines). The power electronics required to power and control these types of machines are typically the most costly component of a resulting system. Therefore, despite the machines desirable performance, such machines have not been widely applied in cost sensitive applications.

There is therefore a need for low cost brushless DC machines capable of providing high torque and low speeds.

It is therefore an object of this invention to provide a dual stator axial gap DC brushless machine where the stators are angularly offset with respect to one another and the rotor disposed between stators has a pole count greater than each stator.

SUMMARY OF THE INVENTION

An apparatus of the invention is provided for an axial gap brushless DC machine comprising: first and second stators, wherein at least one of the stators includes a plurality of slots formed in the stator, and wherein stator windings are disposed within the slots; and a rotor disposed between the first and second stators.

One embodiment provides a stator for an axial gap brushless DC machine comprising: a toroidal-shaped disk; and a plurality of radial slots formed in the disk adapted to receive stator windings.

Another embodiment of the invention provides a method of forming a stator for an axial gap brushless DC machine comprising the steps of: winding one or more strips of magnetic steel on a mandrel to form a toroid shape; and punching slots in the magnetic steel in such a way that when the magnetic steel is wound, the punched slots line up to form a plurality of radial slots in the stator.

Another embodiment of the invention provides an axial gap electric motor comprising: first and second stators coupled to a base; a wheel, rotatably coupled to the base such that the wheel rotates around the stator; and a rotor coupled to the wheel such that the rotor rotates between the first and second stators.

Another embodiment of the invention provides a dual stator axial gap DC brushless machine including first and second stators having equal pole counts, a given pole arc, and a given slot arc. A rotor is disposed between the first and second stators, having a pole count greater than the first and second stators. The pole count ratio between each stator and the rotor is six to eight. The second stator has a given degree of angular displacement relative to the first stator less than, ¾, ½ or ¼ the pole arc of the stators, but not less than a slot arc of the stators. Where the first and second stators each have a pole count of 18 and the rotor has a pole count of 24, the stator pole arc is 20 degrees, the rotor pole arc is 15 degrees, and the given degree of angular displacement is less than 20 degrees, 15 degrees, 10 degrees, or 5 degrees.

DESCRIPTION OF THE INVENTION

In general, the present invention provides a dual stator axial gap DC brushless machine (e.g., a motor, an alternator, etc.). The windings of the stators are inserted into slots formed in the stators, which provides various advantages. A motor of the present invention is highly efficient and weighs significantly less than prior art commercial motors. The lower weight translates into lower costs because the design minimizes the use of expensive magnets and magnetic steel. A motor of the present invention with a high pole count results in a lower speed, higher torque motor. The high power and torque density allow the motor to directly drive a load in many applications, such as light vehicle traction drives. When used with a sophisticated inverter, a machine of the present invention operates over a wide speed range, eliminating or minimizing the need for ratio changes.

Figure 1:
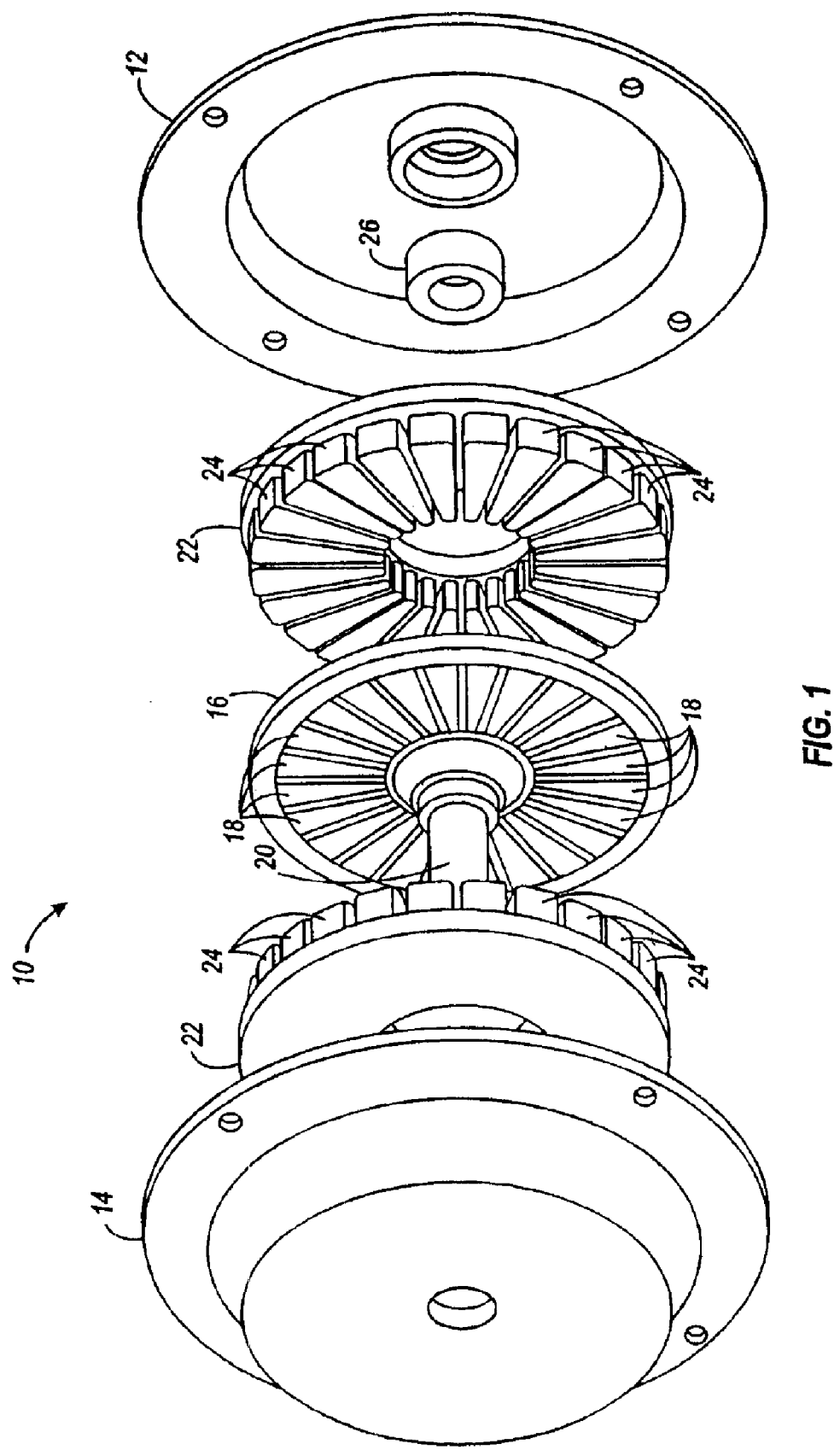
FIG. 1 is an exploded perspective view of a dual stator axial gap brushless DC motor of the present invention.

FIG. 1 is an exploded perspective view of a dual stator axial gap brushless DC motor 10 of the present invention. The motor 10 includes a housing formed by first and second housing members 12 and 14. Disposed within the housing is a rotor 16 having a plurality of wedge shaped permanent magnets 18 which are arranged with alternating north and south poles. The rotor 16 is coupled to a shaft 20 which extends through an opening formed in the housing. Mounted on each side of the rotor 16 is a stator 22. Each stator 22 includes a plurality of windings 24 disposed within slots formed in the stator 22 (described in detail below). The rotor 16 is coupled to the housing members 12 and 14 by bearings 26 which allows the rotor 16 to rotate within the housing.

Figure 2:
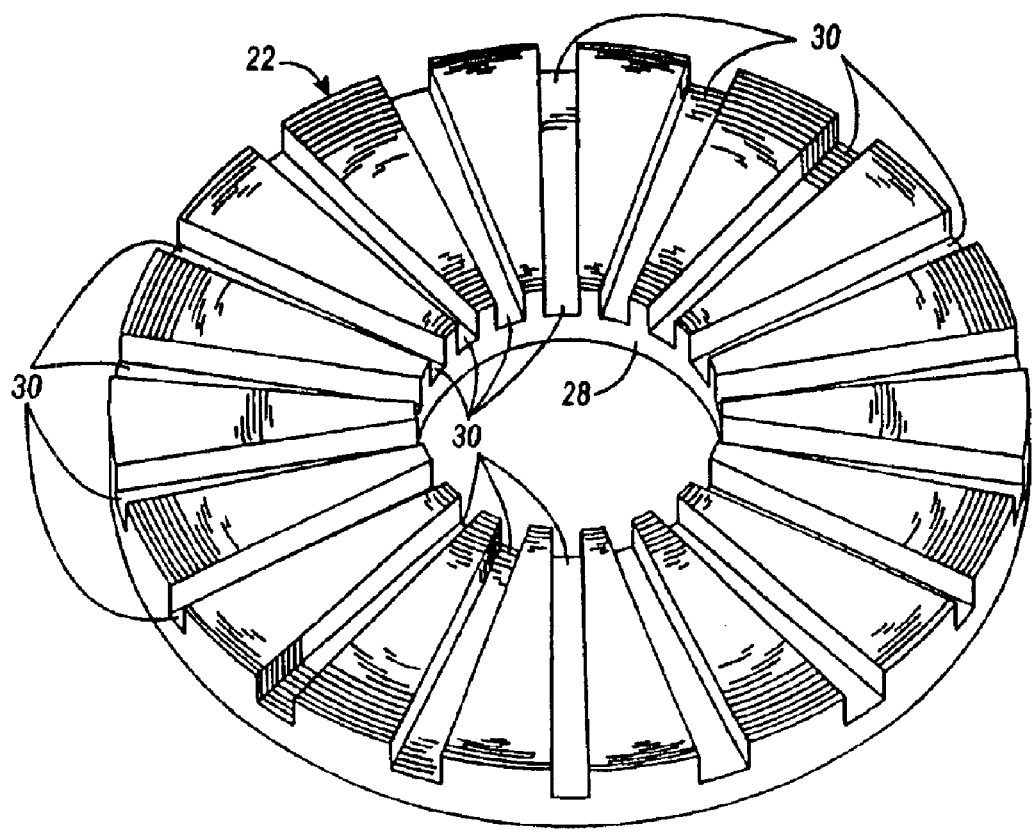
FIG. 2 is a perspective view of a stator of the present invention.
Figure 3:
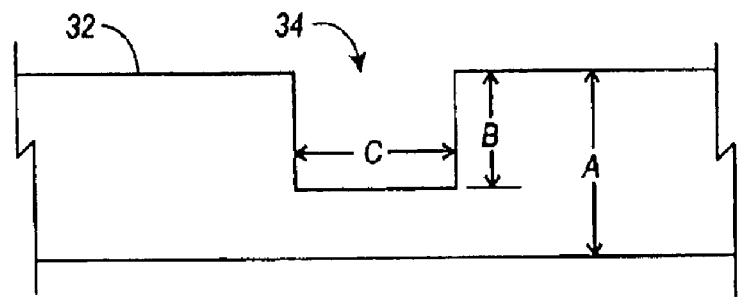
FIG. 3 is a partial view of a strip of magnetic steel, which is used to form the stator shown in FIG. 2.

FIG. 2 is a perspective view of a stator 22 without the windings 24 installed. As shown, the stator 22 has a toroidal shape with an opening 28 formed in its center. A plurality of slots 30 are formed in the stator 22 extending radially from the opening 28 to the periphery of the stator 22. The number of slots 30 depends on the desired characteristics of the motor (e.g., the number of poles, desired power and speed requirements, etc.). The stator 22 is formed by winding a coil of magnetic steel on a mandrel. As a part of the winding process, the coil of magnetic steel is punched in such a way that the slots 30 are formed in the stator 22. FIG. 3 is a partial diagram of a strip 32 of magnetic steel used to form the stator 22 described above. The strip 32 has a width A that is equal to the width of the resulting stator 22 (in one example, A=1.25 inches). In one example, the strip 32 is 0.025 inches thick and is wound around the mandrel 60 turns. When the strip 32 is punched, a plurality of slots 34 and are formed along the length of the strip 32. When the strip 32 is wound around a mandrel, the slots 34 are aligned forming the slots 30 described above. Each slot 34 has a depth B and a width C (in one example, B=0.75 inches and C=0.25 inches). The distance between each of the slots 34 formed along the strip 32 depends on the diameter of the rotor, as well as the number of slots 30 desired. Also, as the strip 32 is wound around the mandrel, the distance between the slots 34 increases, since the length of the strip 32 in each successive turn increases.

As mentioned above, if the number of slots 30 formed around the stator 22 is chosen to provide a machine having desired characteristics. After the stator 22 is formed on the mandrel, the wedge shaped windings 24 (FIG. 1) are inserted in the stator 22 to provide concentrated poles which are then electrically connected to provide a multi-phase winding. In one example, the multi-phase winding is a three phase winding.

The stator 22 formed in the manner described above is a helical laminated stator aligned so that the magnetic field produced by the rotor lies in the plane of the magnetic field produced by the stator windings and the permanent magnets on the rotor. This construction minimizes Eddy current losses. The two stators 22 are oriented with the windings 24 facing each other (FIG. 1) such that a multi-phase sinusoidal magnetic field is produced when the windings are sinusoidally excited. In another example, one of the stators 22 could be made of unpunched magnetic steel to produce the machine having a lower power capability.

Figure 4:
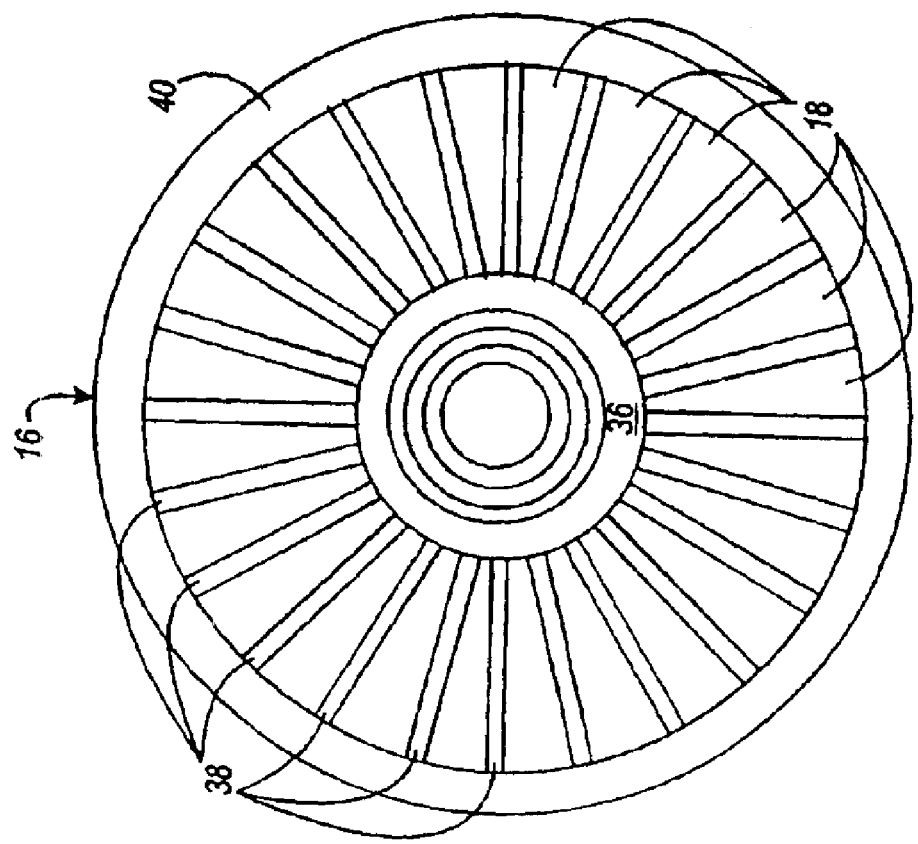
FIG. 4 is a top view of a rotor of the present invention.
Figure 5:
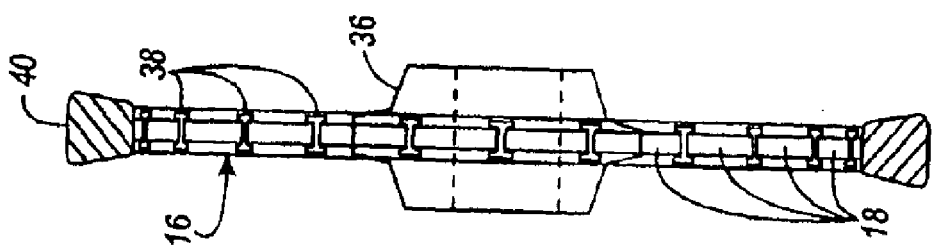
FIG. 5 is a side view of a rotor of the present invention.

FIG. 4 is a top view of a rotor 16 of the present invention. The rotor 16 shown in FIG. 4 includes 24 alternating north and south poles of wedge shaped permanent magnets 18 mounted on the hub 36 and separated by spokes 38. A machine having any desired number of magnets could also be used. A rotor retaining ring 40 is disposed around the periphery of the rotor 16 to retain the magnets 18 to the rotor 16. FIG. 5 is a side view of the rotor 16 shown in FIG. 4.

Like FIG. 4, FIG. 5 shows a hub 36, spokes 38, and magnets 18. However, in FIG. 5, the rotor retaining ring 40 is only partially shown in order to provide a better view of the magnets 18 and spokes 38.

Figure 6:
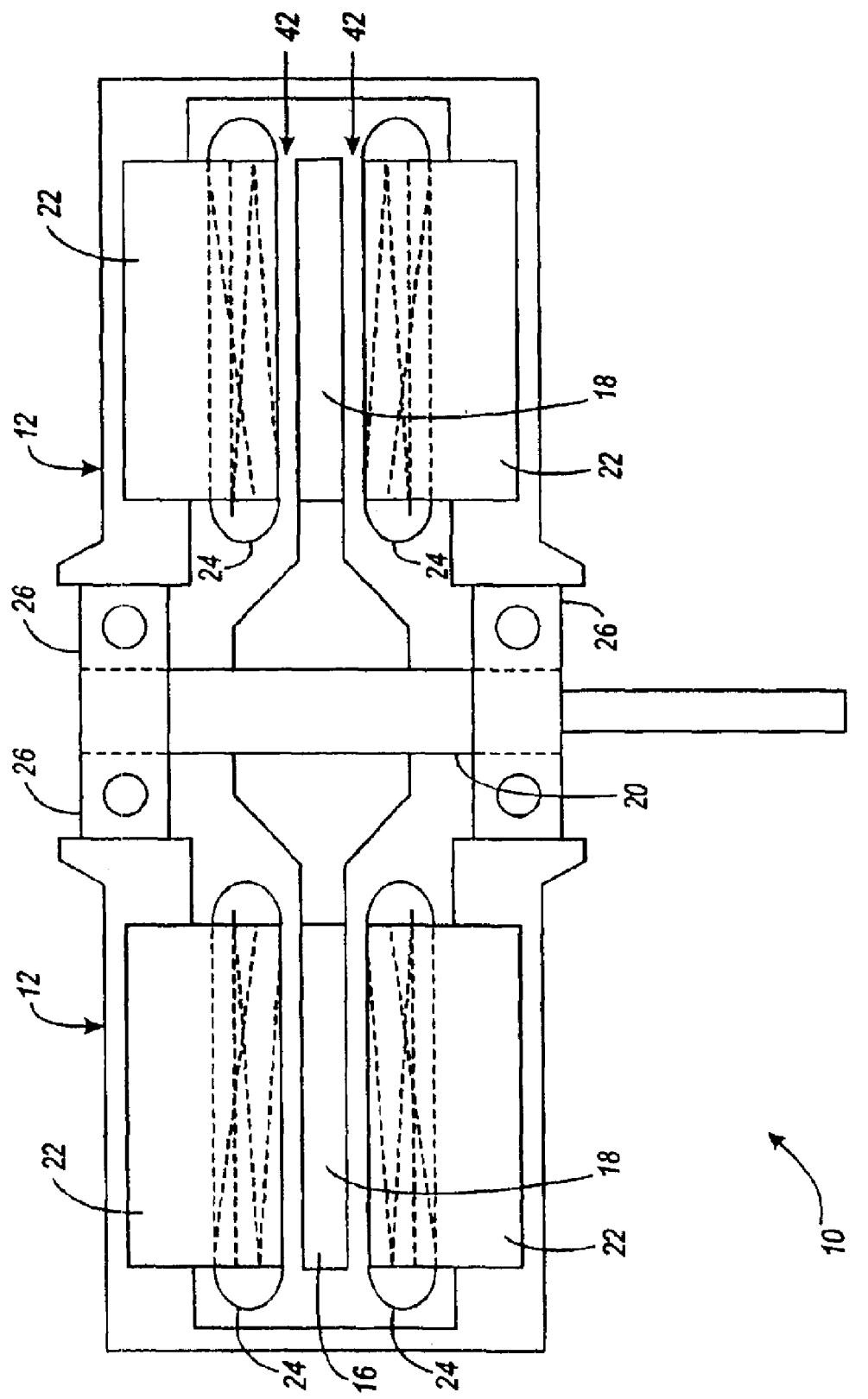
FIG. 6 is a sectional diagram of a motor of the present invention.

FIG. 6 is a sectional diagram of an example of an assembled motor 10 of the present invention. The motor 10 includes a housing 12. First and second stators 22 are coupled to the housing 12 as shown. Each stator 22 has a plurality of slots (not shown) formed for receiving the stator windings 24. Disposed between the first and second stators 22 is a rotor 16. The rotor 16 is mounted on a shaft 20 such that it rotates between the stators 22 and windings 24. The shaft 20 is coupled to the housing 12 via bearings 26. Since the windings 24 are embedded in the magnetic material of the stators 22, the axial air gaps 42 formed between the stators 22 and the rotor 16 is minimal and the amount of magnetic material required to establish and maintain a desired magnetic field is minimized. In one example, the gap between the magnets 18 and the stators 22 is 0.025 inches. If rare earth magnets are used in a traditional motor, the magnets tend to be the most costly component of the motor. Since the design of the present invention requires less magnetic material, the smaller magnets 18 on the rotor 16 can reduce the cost of the motor, compared to the prior art.

Figure 7:
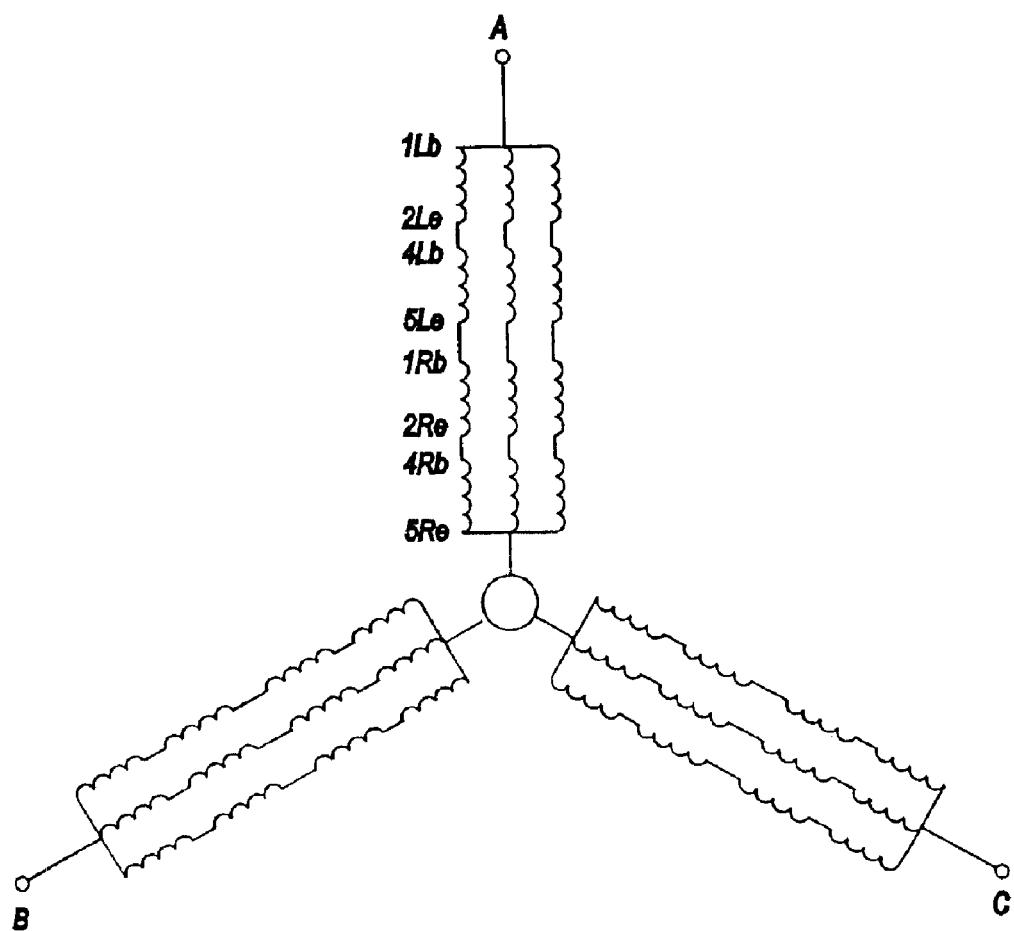
FIG. 7 is a circuit diagram of a motor of the present invention.

FIG. 7 is a circuit diagram of a motor of the present invention. The diagram of FIG. 7 shows an example of a three phase, 24 pole motor.

Figure 8:
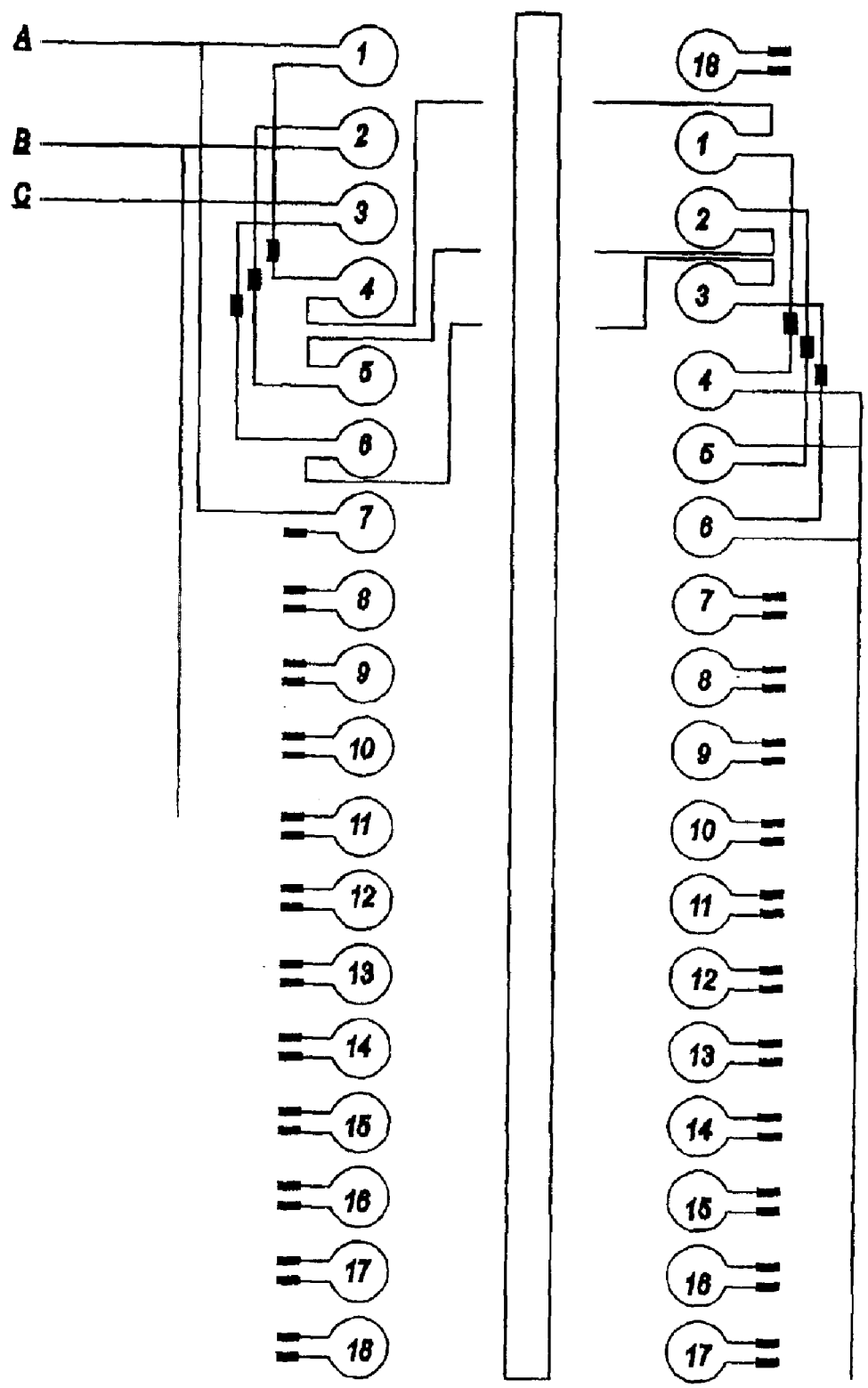
FIG. 8 is a coil connection diagram of a motor of the present invention.

FIG. 8 is a coil connection diagram of a motor of the present invention. The diagram of FIG. 8 shows an example of a three phase dual stator motor having 18 slots and 18 windings in each stator.

Like other brushless DC motors, a motor of the present invention uses a controller to provide the proper power to the motor. If in one example, an inverter provides the desired multiple phase (e.g., three phase) sinusoidal excitation required to drive the machine as a permanent magnet synchronous machine. With the appropriate software driving the digital computer controlling the inverter, the back emf generated by the rotor and sensed by the controller can be used to estimate the rotary position of the machine, eliminating the need for a rotary encoder.

In another example, the machine can be driven by a trapezoidal voltage waveform as a brushless PMDC machine. When driven with trapezoidal excitation, higher losses due to harmonic flux distributions occur in the rotating machine. However, these losses are offset by lower switching losses in the inverter. The inverter may use a rotary encoder to sense the rotor position, or may estimate the rotor position based on the machine back emf.

The open slots formed in the stator of the present invention allow easy insertion of the wedge shaped windings, as opposed to prior art semi-closed slots. The resulting discontinuity in the magnetic flux path may result in harmonics in the flux. If required, appropriate modulation of the stator currents can minimize these harmonic flux variations.

The motor of the present invention may be used in any desired application, including a traction drive as mentioned above. In addition, the invention may be used in other ways. Following is a description of another application of the invention.

Figure 9:
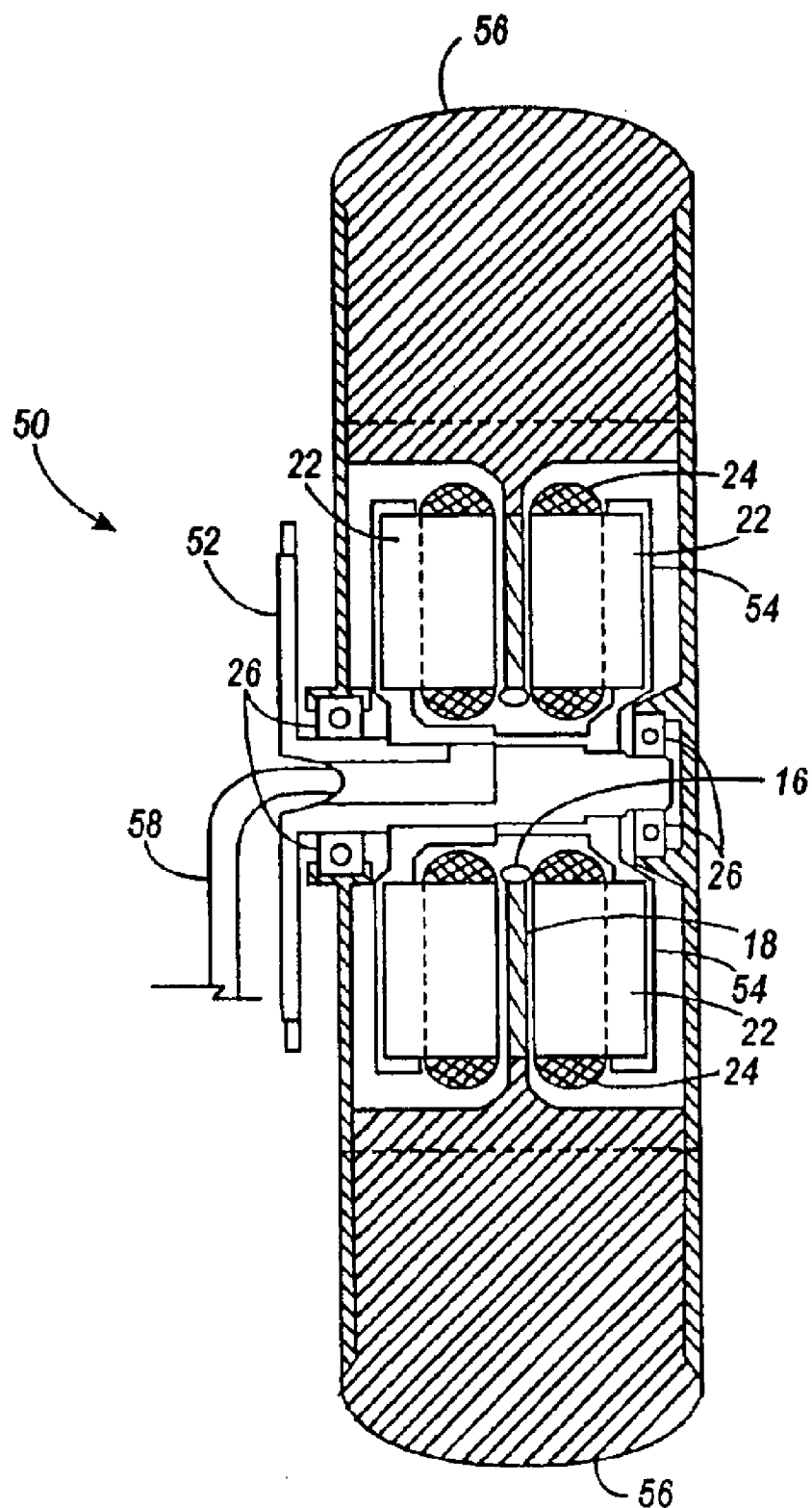
FIG. 9 is a sectional diagram of a wheel motor of the present invention.

FIG. 9 is a sectional diagram of an electric wheel 50 which may be used on various devices, such as a self propelled lawn mower. In general, the electric wheel 50 is comprised of a dual stator axial gap brushless DC motor in which the stator is rigidly mounted to a device and the rotor is a part of the wheel which rotates. The wheel 50 includes a mounting bracket 52 which can be mounted to a device such as a lawn mower. Coupled to the mounting bracket 52 are stator brackets 54 which hold dual stators 22 in place. The stators 22 (described in detail above) include slots in which windings 24 are inserted. A rotatable wheel 56 is coupled via bearings 26 to the mounting bracket 52 so that it may freely rotate relative to the mounting bracket 52 and stators 22. The rotor 16 shown in FIG. 9 is coupled around its outer periphery to the wheel 56, rather than to a hub as previously described. Therefore, the wheel 56 and rotor 16 rotate together. Like the rotors described above, the rotor 16 of FIG. 9 rotates between the stators 22. The power is provided to the electric wheel 50 by power leads 58. A self-propelled lawnmower or other device can be powered using the electric wheels without the need for any other devices to drive the wheels (e.g., belts, chains, gears, drive shafts, etc.). The resulting device therefore may be less expensive, lighter, and more reliable.

Figure 10:
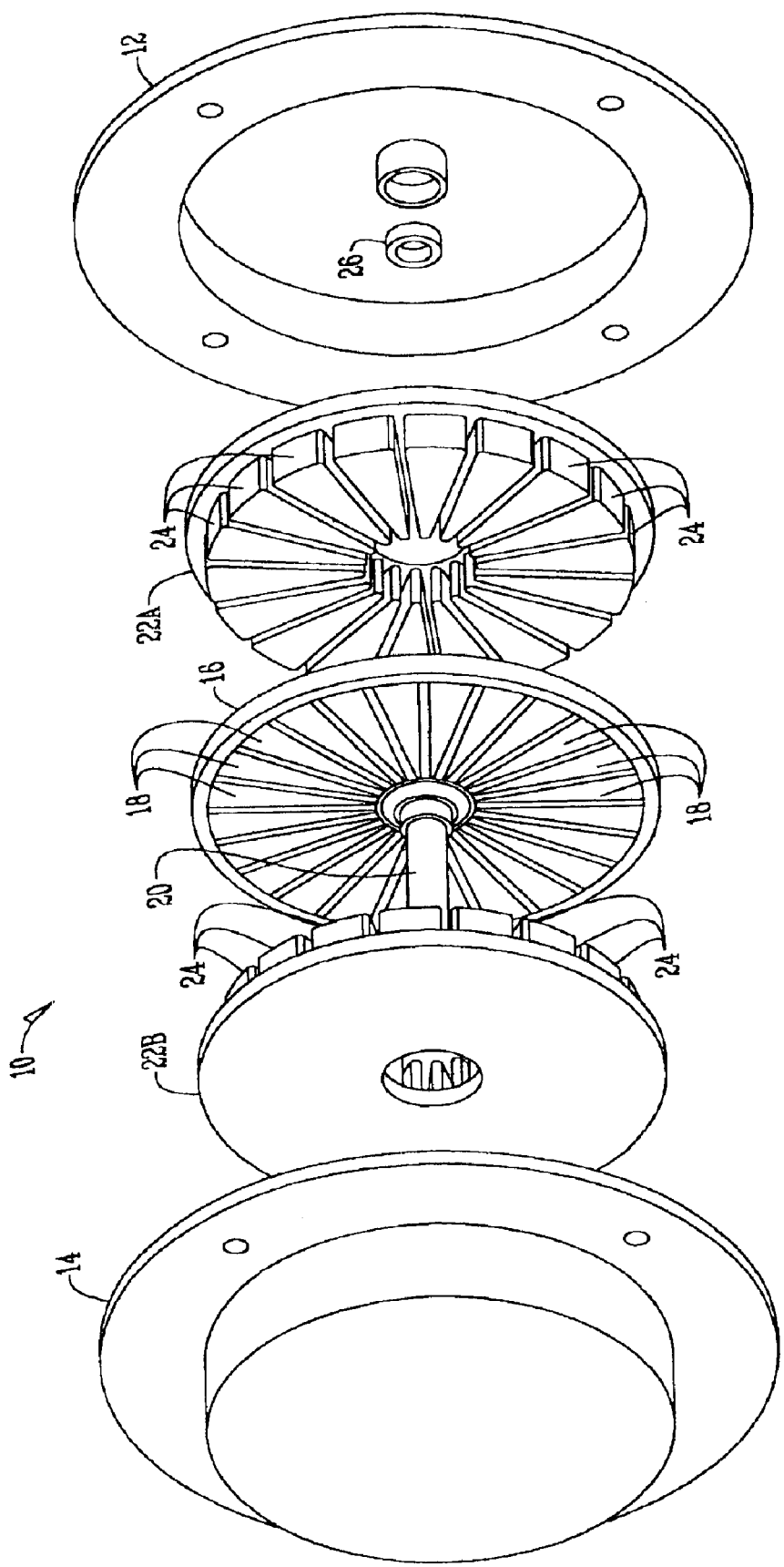
FIG. 10 is an exploded perspective view of another embodiment of the dual stator axial gap DC brushless machine of the present invention.
Figure 11:
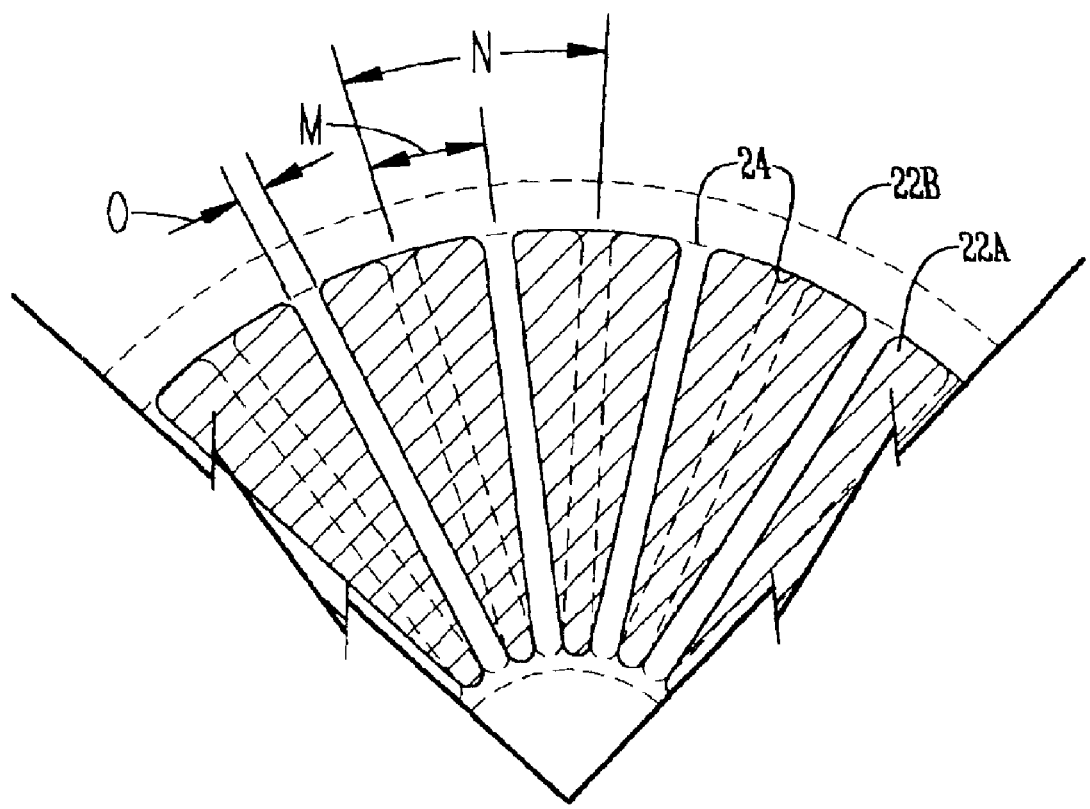
FIG. 11 is a partial sectional end view of the stators of FIG. 10.

Referring to FIGS. 8, 10 and 11, in another embodiment of the invention the first and second stators 22A and 22B have equal pole counts. The rotor 16 is disposed between the first and second stators 22A and 22B, has a pole count greater than the first and second stators 22A and 22B. This unequal pole count between the rotor 16 and the stators 22A and 22B increases the effective pole count of the motor 10.

As shown, the pole count ratio between each stator and the rotor is six to eight. The unequal pole count in this ratio between the rotor 16 and the stators 22A and 22B increases the effective pole count of the motor 10 and results in an effective pole count of the motor 10 equal to the number of magnets 18 on the rotor 16. This increase of the effective pole count of the motor 10 produces higher torque at lower speed. This is particularly useful for use of this motor in a tractor or similar device. It will be understood that while a pole count ratio between each stator and the rotor of six to eight is particularly desirable, other unequal ratios may be used without departing from the present invention.

The second stator 22B has a given degree of angular displacement M relative to the first stator 22A less than the pole arc N of the stators 22A and 22B, but not less than the slot arc O. The given degree of angular displacement M of the second stator 22B relative to the first stator 22A is shown as 10 degrees or ½ the pole arc N of the stators 22A and 22B, but may be any suitable degree less than the pole arc N of the stators 22A and 22B including ¾, ½ or ¼ the pole arc N of the stators 22A and 22B. The given slot arc O is shown as 3 degrees, but one of ordinary skill in the art will appreciate that the slot arc O may vary in size without departing from the present invention.

As shown, the rotor pole arc N is 15 degrees since there are 24 evenly spaced permanent magnets 18. The first and second stators 22A and 22B each have a pole count of 18 and the rotor 16 has a pole count of 24. The stator pole arc N is 20 degrees since there are 18 evenly spaced windings 24.

Where the given degree of angular displacement M is ¾ the pole arc N of the stators 22A and 22B, and where the stators 22A and 22B are wired with operating fields as shown in FIG. 8, the angular displacement M of the stators 22A and 22B results in a field weakened region for extending the speed range as doubled, in tractor drive applications for instance. Where no field weakened region is desired, then any positive or negative angular displacement M will provide an improved motor efficiency.

Where the given degree of angular displacement M is ½ the pole arc N of the stators 22A and 22B, the motor 10 minimizes field distortions from the windings 24 which minimizes the losses generated by flux harmonics.

It may also be desirable to set the given degree of angular displacement M at ¼ the pole arc N of the stators 22A and 22B. Where this is done, the electrical connection to the stators 22A and 22B must be reversed.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An axial gap brushless DC machine comprising:
    first and second stators having equal pole counts, a given pole arc, and a given slot arc;
    a rotor disposed between the first and second stators, having a pole count;
    the second stator has a given degree of angular displacement relative to the first stator not less than the slot arc of the stators.

2. The axial gap brushless DC machine of claim 1, wherein the given degree of angular displacement is selected from the group consisting of ¾ the pole arc of the stators, ½ the pole arc of the stators, and ¼ the pole arc of the stators.

3. The axial gap brushless DC machine of claim 2, wherein the first and second stators each have a pole count of 18 resulting in a pole arc of 20 degrees and the rotor has a pole count of 24 resulting in a pole arc of 15 degrees, and the given degree of angular displacement is selected from the group consisting of 15 degrees, 10 degrees, and 5 degrees.

4. The axial gap brushless DC machine of claim 1, wherein each stator is a toroidal-shaped disk having a plurality of radial slots formed in the disk adapted to receive stator windings, wherein the plurality of radial slots are arranged such that wedge-shaped stator windings can be disposed within the slots.

5. The stator of claim 4, wherein the toroidal-shaped disk is formed by a coil of magnetic steel and wherein the slots are formed in the disk by punching a plurality of slots in one or more strips of the magnetic steel.

6. The stator of claim 4, wherein the number of radial slots is related to the number of poles of the machine.

7. The axial gap brushless DC machine of claim 1, further comprising a plurality of permanent magnets formed on the rotor.

8. The axial gap brushless DC machine of claim 1, wherein the first and second stators are coupled to a base, the machine further comprising a wheel rotatably coupled to the base such that the wheel rotates around the stator and the rotor is coupled to the wheel such that the rotor rotates between the first and second stators.

9. An axial gap brushless DC machine comprising:
    first and second stators having equal pole counts, a given pole arc, and a given slot arc;
    a rotor disposed between the first and second stators, having a pole count greater than the first and second stators individually, and wherein a pole count ratio between each stator and the rotor is six to eight; and
    the second stator has a given degree of angular displacement relative to the first stator less than the pole arc of the stators and, wherein the given degree of angular displacement is not less than the slot arc of the stators.

10. The axial gap brushless DC machine of claim 9, wherein the given degree of angular displacement is selected from the group consisting of ¾ the pole arc of the stators, ½ the pole arc of the stators, and ¼ the pole arc of the stators.

11. The axial gap brushless DC machine of claim 10, wherein the first and second stators each have a pole count of 18 resulting in a pole arc of 20 degrees and the rotor has a pole count of 24 resulting in a pole arc of 15 degrees, and the given degree of angular displacement is selected from the group consisting of 15 degrees, 10 degrees, and 5 degrees.

12. The axial gap brushless DC machine of claim 9, wherein each stator is a toroidal-shaped disk having a plurality of radial slots formed in the disk adapted to receive stator windings, wherein the plurality of radial slots are arranged such that wedge-shaped stator windings can be disposed within the slots.

13. The stator of claim 12, wherein the toroidal-shaped disk is formed by a coil of magnetic steel and wherein the slots are formed in the disk by punching a plurality of slots in one or more strips of the magnetic steel.

14. The stator of claim 12, wherein the number of radial slots is related to the number of poles of the machine.

15. The axial gap brushless DC machine of claim 9, further comprising a plurality of permanent magnets formed on the rotor.

16. The axial gap brushless DC machine of claim 14, wherein the permanent magnets are wedge-shaped magnets.

17. The axial gap brushless DC machine of claim 9, wherein the first and second stators are coupled to a base, the machine further comprising a wheel rotatably coupled to the base such that the wheel rotates around the stator and the rotor is coupled to the wheel such that the rotor rotates between the first and second stators.

18. An axial gap brushless DC machine comprising:

first and second stators having equal pole counts, a given pole arc, and a given slot arc;

a rotor disposed between the first and second stators, having a pole count greater than the first and second stators individually;

wherein a given degree of angular displacement between the second and first stators is selected from the group consisting of ¾ the pole arc of the stators, ½ the pole arc of the stators, and ¼ the pole arc of the stators; and wherein a pole count ratio between each stator and the rotor is six to eight, and wherein the given degree of angular displacement between the second and first stators is not less than a slot arc of the stators.

* * * * *

UNITED STATES PATENT AND TRADEMARK OFFICE
CERTIFICATE OF CORRECTION

PATENT NO. : 6,995,494 B2
DATED : February 7, 2006
INVENTOR(S) : Oyvin Haugan and Bernard B. Poore It is certified that error appears in the above-identified patent and that said Letters Patent is hereby corrected as shown below:

Column 7,
Line 23, delete "14" and insert -- 15 --.

Signed and Sealed this

Eleventh Day of April, 2006

JON W. DUDAS
*Director of the United States Patent and Trademark Office*